Oct. 11, 1955 C. E. MINES 2,720,079
CONDUIT CLAMP
Filed Dec. 30, 1952
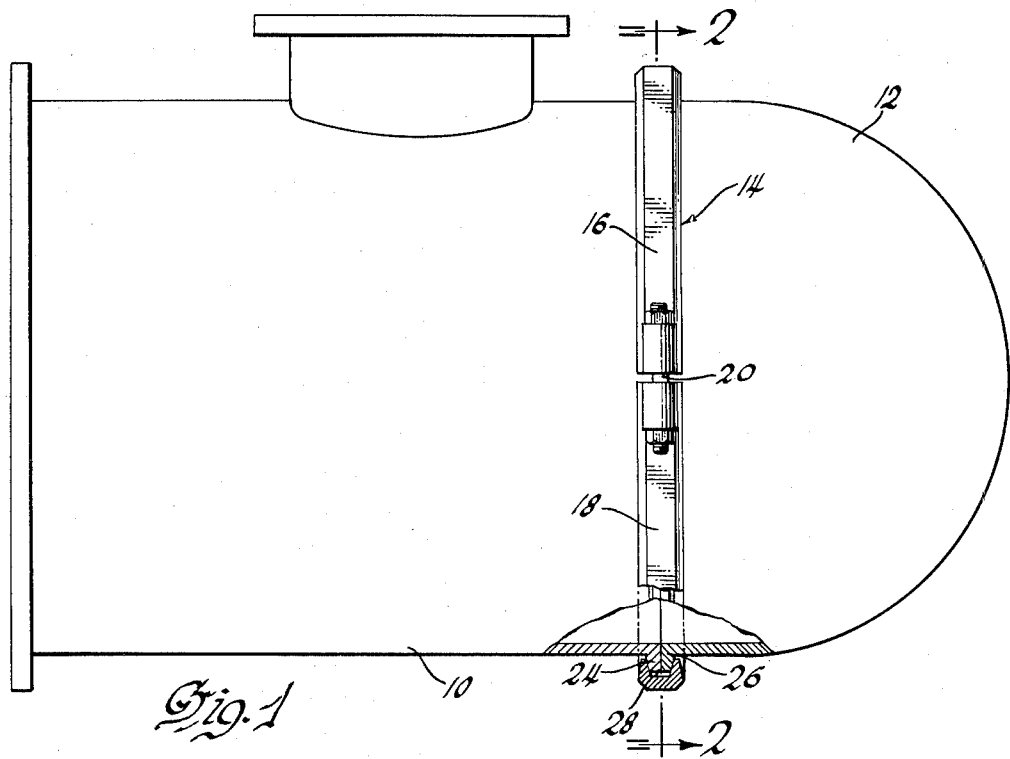
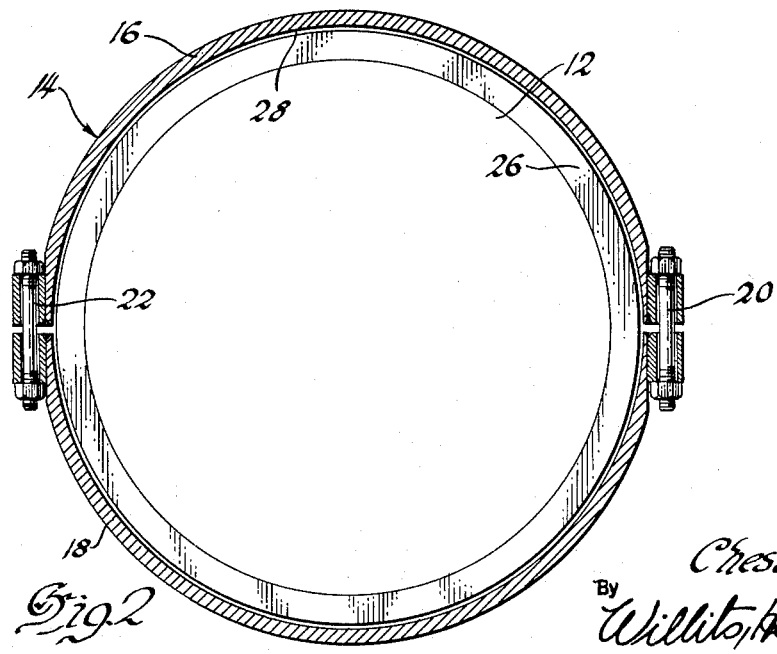
Inventor
Chester E. Mines
By Willits, Helwig & Gaillio
Attorneys

# United States Patent Office 2,720,079
Patented Oct. 11, 1955

2,720,079

CONDUIT CLAMP

Chester E. Mines, Indianapolis, Ind., assignor to General Motors Corporation, Detroit, Mich., a corporation of Delaware Application December 30, 1952, Serial No. 328,773

8 Claims. (Cl. 60—39.32)

This invention relates to conduit clamps and more particularly to a ring clamp for connecting a pair of high temperature conduits, or the like.

Ring clamps are commonly used for securing together adjacent ends of high temperature conduit structure. The clamps are generally split and bolted together to effect clamping of the conduits. It has been found desirable in some instances, for example, in the construction of gas turbine combustion chambers, that the clamps be made of different materials than the conduits because of different strength and economy requirements of the clamp and conduits. As an example, it was desired that a combustion chamber casing and its cover be made of certain carbon steel and a clamp to join them be made of stainless steel. In practice, certain clamps would tend to loosen with increase in temperature while other clamps would tend to tighten and overstress the bolts with increase in temperature when made of various stainless steels, both conditions being highly objectionable. Investigation revealed that most stainless steel alloys have a higher coefficient of expansion than the carbon steel but that some have a lower coefficient of expansion.

An object of the invention is to provide a method whereby a pair of conduits of one material may be clamped together by a clamp of different materials which will expand and contract substantially equally with the conduits during changes in temperature thereby resulting in a uniformly tight joint at all times.

The invention is accomplished by fashioning the clamp in several parts of different materials and so relating the sizes with the expansion rates of the parts that the clamp will expand and contract substantially equally with the conduits so that the clamp will neither tighten nor loosen with changes in temperature.

Further objects and advantages of the present invention will be apparent from the following description, reference being had to the accompanying drawing wherein a preferred form of the invention is clearly shown.

In the drawing:

Fig. 1 is an elevational view of a gas turbine combustion chamber casing and its end cover clamped together in accordance with the invention and partially broken away to show the clamp in section; and Fig. 2 is a sectional view taken on the plane indicated by line 2—2 of Fig. 1.

Referring now to the drawing in detail, the gas turbine combustion chamber includes a circular conduit or casing 10 and a circular conduit or end cover 12 secured thereto by a ring clamp 14 having an upper segment 16 and a lower segment 18 secured together by bolts 20 and 22. The conduits 10 and 12 are provided with mating flanges 24 and 26 which are received in the peripheral grooves 28 of the ring clamp 14. The flanges and grooves are complementally tapered in the usual manner, as shown, so that the conduits are pinched or clamped together when the bolts are tightened.

It was desired that the conduits 10 and 12 be made of carbon steel and that the ring clamp 14 be made of stainless steel. It was determined that some stainless steel alloys had higher coefficients of expansion than the carbon steel used in the conduits while other stainless steel alloys had lower coefficients of expansion. The clamp ring 14 was therefore made into the two segments 16 and 18 with segment 16 of a stainless steel having an expansion coefficient less than the conduits' expansion coefficient and segment 18 of a different stainless steel having an expansion coefficient greater than the conduits' expansion coefficient, and the peripheral lengths or sizes of the segments were so related to their different expansion coefficients that the clamp would expand and contract substantially equally with the conduits during changes in temperature. The change in peripheral lengths and circumference of the segments and conduits each substantially follows the physical law $$L_2 = L_1(1+at)$$

where $L_1$ = the peripheral length at the low temperature,
$L_2$ = the peripheral length at the high temperature,
$a$ = the mean coefficient of linear expansion, and
$t$ = the difference between the high and low temperatures.

Let the subscript $x$ denote one segment, the subscript $y$ denote the other segment, denote the conduit without subscript, then $$L_1 = L_{1x} + L_{1y}$$

and $$L_2 = L_{2x} + L_{2y}$$

if equal expansion and contraction of the clamp with the conduits is to be had during a change in temperature. Therefore, the desired relation between the peripheral lengths of the segments and conduits and their coefficients of expansion may be noted as $$L_1 = L_{1x} + L_{1y}$$
$$L_1(1+at) = L_{1x}(1+a_x t_x) + L_{1y}(1+a_y t_y)$$

and since the temperatures of the conduits and segments are substantially the same $$L_1 = L_{1x} + L_{1y}$$
$$L_1(1+at) = L_{1x}(1+a_x t) + L_{1y}(1+a_y t)$$

These equations may be solved for the peripheral lengths of the segments ($L_{1x}$ and $L_{1y}$) by designating the temperature range ($t$), the peripheral length of the conduit ($L_1$), and the expansion coefficients of the conduit and segments ($a$, $a_x$ and $a_y$) or they may be solved for the expansion coefficients of the segments ($a_x$ and $a_y$) so that suitable segment materials having those coefficients may be chosen by designating the temperature range ($t$), the peripheral lengths of the segments and conduit ($L_1$, $L_{1x}$ and $L_{1y}$), and the expansion coefficient of the conduit ($a$).

As an example, the combustion chamber illustrated had a means flange and clamp diameter of 37.781 inches at room temperature and was designed for an operating temperature of 725° F. and a non-operating (room) temperature of 70° F. The casing was made of ASTM 285 steel with an expansion coefficient of .0000077 inch per inch of length per degree Fahrenheit so that its diameter grew .1930 inch during operation. The clamp ring was made in equal half segments; one-half being made of type 347 stainless steel having an expansion coefficient of .00000975 so that it grew in radius .1206 inch, and the other half being made of type 410 stainless steel having an expansion coefficient of .0000063 so that it grew in radius .0779 inch. Thus the clamp increased in diameter .1985 inch while the casing grew .1930 inch and the difference in growth of .0055 inch was small enough to be acceptable. Obviously, the difference in growth might have been iliminated entirely by increasing the arcuate length of the type 410 segment and correspondingly reducing the arcuate length of the type 347 segment, or by selecting a different type of stainless steel for either or both of the segments. A segment whose desired length extends over an arc substantially greater than 180° should be subdivided into two segments so that the clamp may be easily asembled on the conduits.

Noncircular tubular conduits may also be clamped together in accordance with the invention preferably by providing more than two alternating segments of different materials to insure that the shape growth of the clamp and conduit conform closely to each other as well as their peripheral length growth.

While the preferred embodiment of the invention has been described fully in order to explain the principles of the invention, it is to be understood that modifications in structure may be made by the exercise of skill in the art within the scope of the invention, which is not to be regarded as limited by the detailed description of the preferred embodiment.

I claim:

1. In combination, two bodies having adjoining ends of substantially the same peripheral length, said ends having substantially equal coefficients of expansion and being subjected to a substantial range of temperature variation, and a clamp encompassing said ends and holding them in assembled relation, said clamp comprising at least two parts differing in coefficients of expansion from each other and said ends, the sum of the individual products of the lengths and the coefficients of said parts being substantially equal to the product of the peripheral length and the coefficient of said ends.

2. A pair of tubular conduits of one material having adjoining ends and a clamp encircling the ends to secure the conduits in assembled relation, the clamp having at least two connected and peripherally extending segments of different materials having respective coefficients of expansion above and below the coefficient of expansion of the conduits, the sizes and coefficients of expansion of the segments being so related to the size and coefficient of expansion of the conduits that the clamp will expand and contract substantially equally with the conduits in a radial sense during substantially equal temperature changes.

3. Apparatus according to claim 2 wherein the conduits are circular and the clamp is a circular ring clamp.

4. Apparatus according to claim 3 wherein the ring clamp segments are of different stainless steel alloys.

5. Apparatus according to claim 4 wherein the conduits are of carbon steel.

6. Apparatus according to claim 2 wherein one conduit forms a combustion chamber casing and the other conduit forms an end cover for the casing.

7. Apparatus according to claim 2 wherein the segments are bolted together.

8. Apparatus that is subject to substantial temperature variation comprising a member of one material and a removable clamp of other materials that bands around the periphery of the member, the clamp having at least two successive parts in its length of different materials with respective coefficients of expansion above and below the coefficient of expansion of the member, the lengths and the coefficients of expansion of the clamp parts being so related to the peripheral size and the coefficient of expansion of the member that the clamp will expand and contract substantially equally with the member in a radial sense.

References Cited in the file of this patent

UNITED STATES PATENTS

| | | |
|---|---|---|
| 1,886,421 | Perkins | Nov. 8, 1932 |
| 2,086,857 | Derby | July 13, 1937 |
| 2,138,946 | Trickey | Dec. 6, 1938 |
| 2,219,085 | Watson | Oct. 22, 1940 |
| 2,282,354 | Gunn | May 12, 1942 |
| 2,611,238 | Fryer | Sept. 23, 1952 |